(12) United States Patent
Saltenis et al.

(10) Patent No.: US 7,777,158 B2
(45) Date of Patent: Aug. 17, 2010

(54) METHOD AND STEAMING OVEN AND COLLECTOR PLATE

(75) Inventors: Victor D. Saltenis, Kirtland, OH (US);
Carl F. Scheu, III, Middleburg Heights, OH (US); Rupesh T. Savadekar, Cleveland, OH (US); David S. Schwerzler, Chagrin Falls, OH (US); Joseph S. Bellassai, Mentor, OH (US); John E. Richnafsky, Jefferson, OH (US); Jason D. Schreiner, Cleveland Heights, OH (US)

(73) Assignee: Cleveland Range, Cleveland, OH (US)

( * ) Notice: Subject to any disclaimer, the term of this patent is extended or adjusted under 35 U.S.C. 154(b) by 1311 days.

(21) Appl. No.: 11/017,140

(22) Filed: Dec. 20, 2004

(65) Prior Publication Data

US 2005/0173398 A1 Aug. 11, 2005

Related U.S. Application Data

(63) Continuation-in-part of application No. 10/420,548, filed on Apr. 22, 2003, now Pat. No. 6,833,534.

(60) Provisional application No. 60/374,993, filed on Apr. 23, 2002.

(51) Int. Cl.
*F27B 14/00* (2006.01)
*A21B 1/08* (2006.01)

(52) U.S. Cl. ......... 219/401; 219/385; 219/386; 219/521; 126/20; 126/21 A; 126/369; 99/330; 99/331; 99/339; 99/400

(58) Field of Classification Search ............ 219/401, 219/385–386, 521; 126/20, 21 A, 369; 99/330–331, 99/339–340, 400
See application file for complete search history.

(56) References Cited

U.S. PATENT DOCUMENTS

| 527,252 | A | 10/1894 | Stroud |
| 677,035 | A | 6/1901 | Laird |
| 931,088 | A | 8/1909 | Roberts ............ 219/401 |
| 1,051,503 | A | 1/1913 | Klein |
| 1,714,311 | A | 5/1929 | Keiper |
| 2,097,793 | A | 11/1937 | Howell ............ 126/41 |
| 2,164,226 | A | 4/1938 | Bayer ............ 126/273 |
| 2,766,366 | A | 10/1956 | Eckhoff ............ 219/401 |
| 4,506,598 | A | 3/1985 | Meister ............ 99/330 |
| 4,648,382 | A | 3/1987 | Greenbacker ............ 219/401 |
| 4,773,319 | A | 9/1988 | Holland ............ 99/446 |

(Continued)

OTHER PUBLICATIONS

International Search Report—Appln. No. PCT/US03/12319 dated Feb. 12, 2004.

*Primary Examiner*—Shawntina Fuqua
(74) *Attorney, Agent, or Firm*—Ohlandt, Greeley, Ruggiero & Perle, L.L.P.

(57) ABSTRACT

A steaming oven having a collector plate disposed in an oven chamber. A collector plate is disposed above a boiling water reservoir in the oven chamber. The collector plate has a drain tube inserted into an overfill tube. Waste material from the steam and food droppings is conveyed from the oven chamber via the drain tube and the overfill tube. A barrier shields one or more water level probes or sensors from water turbulence, thereby providing reliable water level sensing by the water level probes or sensors.

23 Claims, 5 Drawing Sheets

U.S. PATENT DOCUMENTS

| | | | |
|---|---|---|---|
| 5,235,903 A | 8/1993 | Tippmann | 99/331 |
| 5,313,877 A | 5/1994 | Holland | 99/446 |
| 5,318,792 A | 6/1994 | Tippmann | 426/510 |
| 5,411,753 A | 5/1995 | Tippmann | 426/510 |
| 5,515,773 A * | 5/1996 | Bullard | 99/330 |
| 5,662,959 A | 9/1997 | Tippmann | 426/510 |
| 5,767,487 A | 6/1998 | Tippmann | 219/440 |
| 5,869,812 A * | 2/1999 | Creamer et al. | 219/401 |
| 5,993,878 A | 11/1999 | Tippmann | 426/510 |
| 6,125,738 A | 10/2000 | Poister | 99/339 |
| 6,152,024 A | 11/2000 | Tippmann | 99/472 |
| 6,213,002 B1 | 4/2001 | Batten et al. | 99/340 |
| 6,267,046 B1 | 7/2001 | Wanat | 99/232 |
| 7,045,745 B2 * | 5/2006 | Kim | 219/400 |

* cited by examiner

METHOD AND STEAMING OVEN AND COLLECTOR PLATE

This application is a continuation-in-part of U.S. patent application, Ser. No. 10/420,548, now U.S. Pat. No. 6,833,534 which application claims the benefit of U.S. Provisional Application, Ser. No. 60/374,993, filed on Apr. 23, 2002, the entire contents of each of which are incorporated herein by reference.

FIELD OF THE INVENTION

This invention relates to a method and a steaming oven having a collector plate that collects and disposes of waste material from cooking food products with steam.

BACKGROUND OF THE INVENTION

Sub-atmospheric cook-and-hold steaming ovens are known. For example, U.S. Pat. No. 5,235,903 discloses an open topped water holding tray that is disposed at the bottom of the oven. The oven includes means to heat the water to provide steam for cooking and/or holding food products warm and moist. A manually operated drain valve is provided near the lowermost portion of the water tray. An optional grease catching pan is disposed between the racks of the oven and the water tray. The drain valve is manually operated to periodically drain the water tray.

The grease catching pan catches droppings (e.g., condensed steam entrained with food protein, food scraps and other undesirable materials) that drip from food being cooked in the oven. This prevents the droppings from one food batch entering the water tray, which could cause foam to develop in the steaming compartment. The foam could then spill from the cooking compartment when the door is opened, thereby causing slipping hazards and other undesirable effects. Although the grease catching pan catches the droppings, an operator needs to keep a close watch to empty the pan before it fills and overflows into the water tray.

Drip pans with a drain tube are also known. For example, U.S. Pat. No. 4,773,319 discloses a drip pan that is sloped to guide droppings to a channel leading to a drain tube that exits the cooking chamber. This arrangement is disposed between the grill or grate and the flames of a burner so as to minimize flaming due to grease droppings.

It is also known to provide a water tray with an overflow control. For example, U.S. Pat. No. 2,097,793 discloses a water tray that serves the dual function of providing steam to the cooking chamber and the collection of waste droppings. A funnel is disposed in the tray to direct the waste droppings and water to a catch pan as the water/grease level exceeds the height of the funnel. The dual function water tray has the disadvantage that waste contaminants enter the boiling water tray, which in turn contaminates food cooked in later batches with the tastes or residues of previously cooked items.

There is a need for an improved steaming oven and droppings removal system.

There is also a need for providing turbulence free water level measurements.

SUMMARY OF THE INVENTION

A steaming oven of the present invention comprises an oven chamber and a water reservoir disposed in the oven chamber to provide steam therein. At least one water level probe or sensor is located to sense a water level in the water reservoir. A barrier is located at least partially in the water reservoir to provide a quiet zone about said water level probe. The water level is stabilized in the quiet zone despite water turbulence outside said quiet zone.

In one embodiment of the steaming oven of the present invention, the barrier comprises a wall that extends at least partially below the water level.

In another embodiment of the steaming oven of the present invention, a tab is located to one side of the water level probe to provide additional shielding from the water turbulence. Preferably, the water level probe is disposed at a side of the water reservoir. The tab is preferably angled toward the side.

In another embodiment of the steaming oven of the present invention, another tab that is located to the opposite side of the probe to provide further shielding from the water turbulence.

In another embodiment of the steaming oven of the present invention, a collector plate is positioned above the water level.

Preferably, the barrier is attached to the collector plate by a fastener selected from the group consisting of: weldment, bolts, screws, adhesives, a form press fit construction or a combination thereof.

In another embodiment of the steaming oven of the present invention, a conduit is positioned to convey waste material collected by the collector plate from the oven chamber. The conduit is at least partially disposed in the water reservoir.

In another embodiment of the steaming oven of the present invention, an opening of the conduit is above the water level in the reservoir and waste material is conveyed to the opening of the conduit.

In another embodiment of the steaming oven of the present invention, the opening is in registry with a drain of the collector plate.

In another embodiment of the steaming oven of the present invention, the waste material is conveyed from the oven via the drain, the conduit and an exit hole.

In another embodiment of the steaming oven of the present invention, the barrier wall and at least one of the tabs is a single unitary piece.

The method of the present invention provides steam in a steaming oven. The steam is provided from a water reservoir. A water level in the water reservoir is sensed with at least one water level probe or sensor. The water level probe is shielded from water turbulence in the water reservoir to provide a sensed water level without substantial interference from the water turbulence.

In one embodiment of the method of the present invention, the shielding step shields the water level probe with a barrier.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

As used herein, steaming oven is intended to include any cooking oven that uses steam in whole or in part to cook. For example, the oven may use steam only or steam in combination with convection, conduction or other thermal transfer. Thus, the steaming oven of the present invention includes, for example, steam ovens as well as convection ovens, microwave ovens or combinations thereof that also employ steam.

Figure 1:
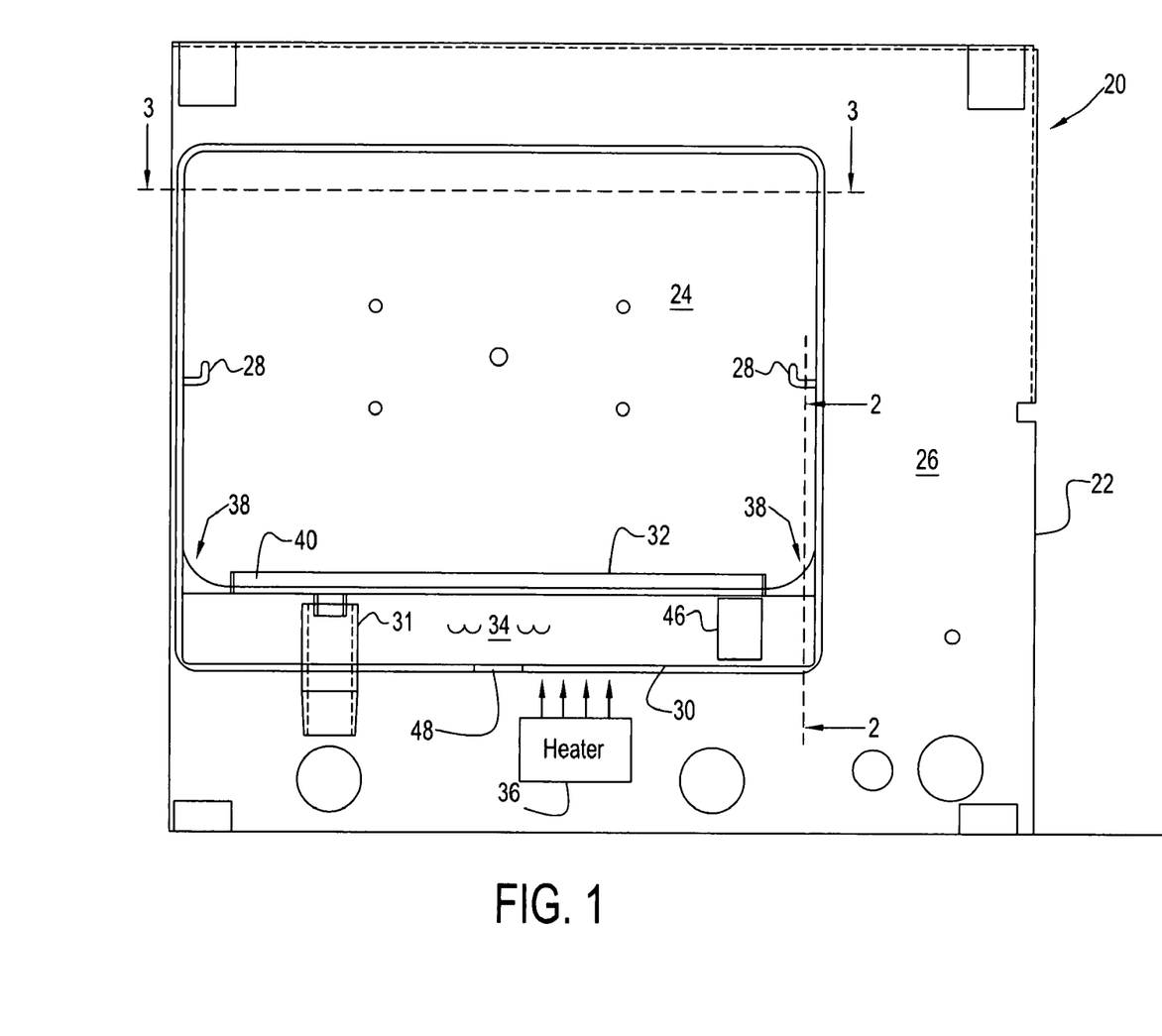
FIG. 1 is a front view of a steaming oven of the present invention with the front door removed.
Figure 2:
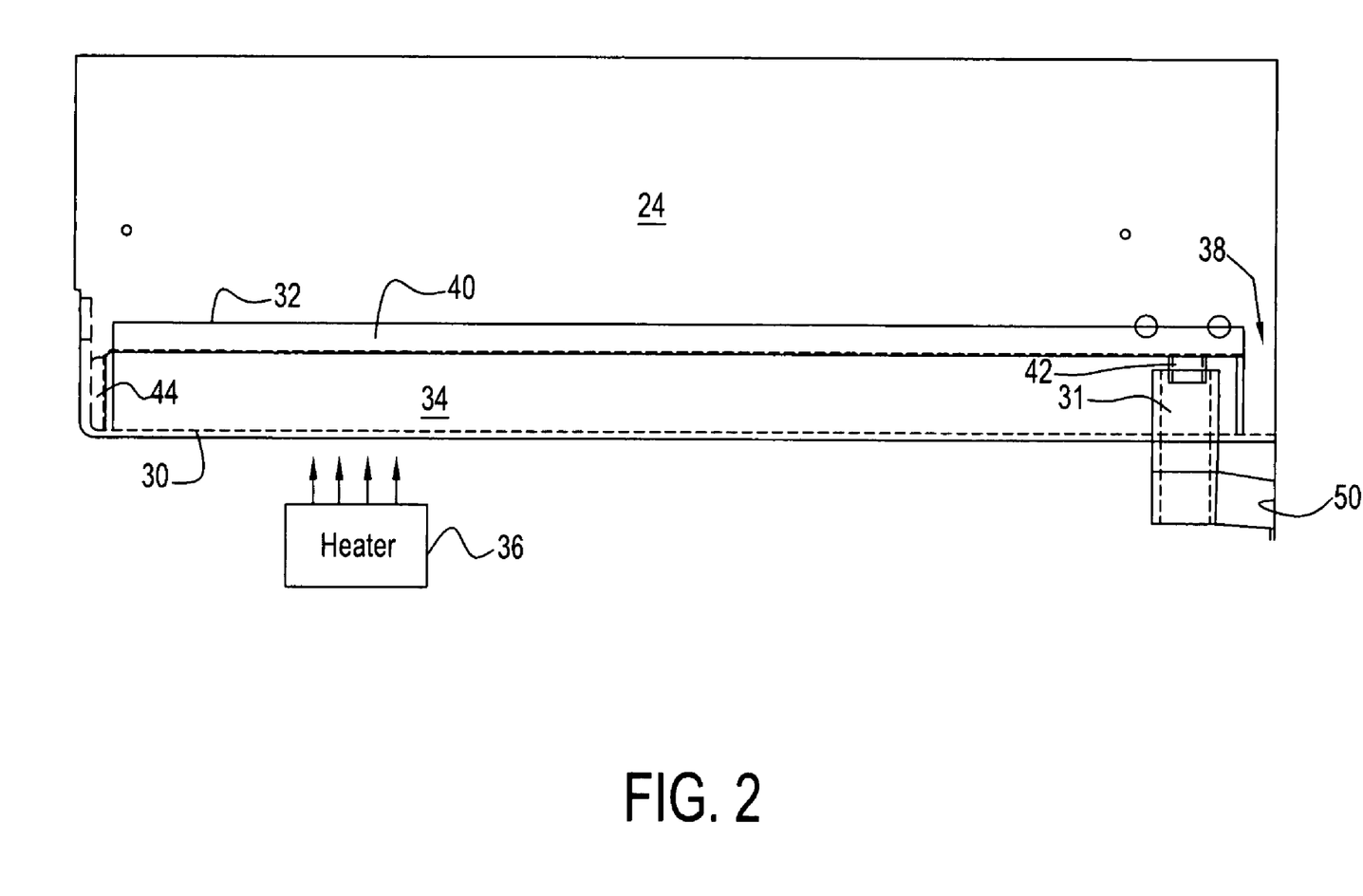
FIG. 2 is a view along the line 2 of FIG. 1.
Figure 3:
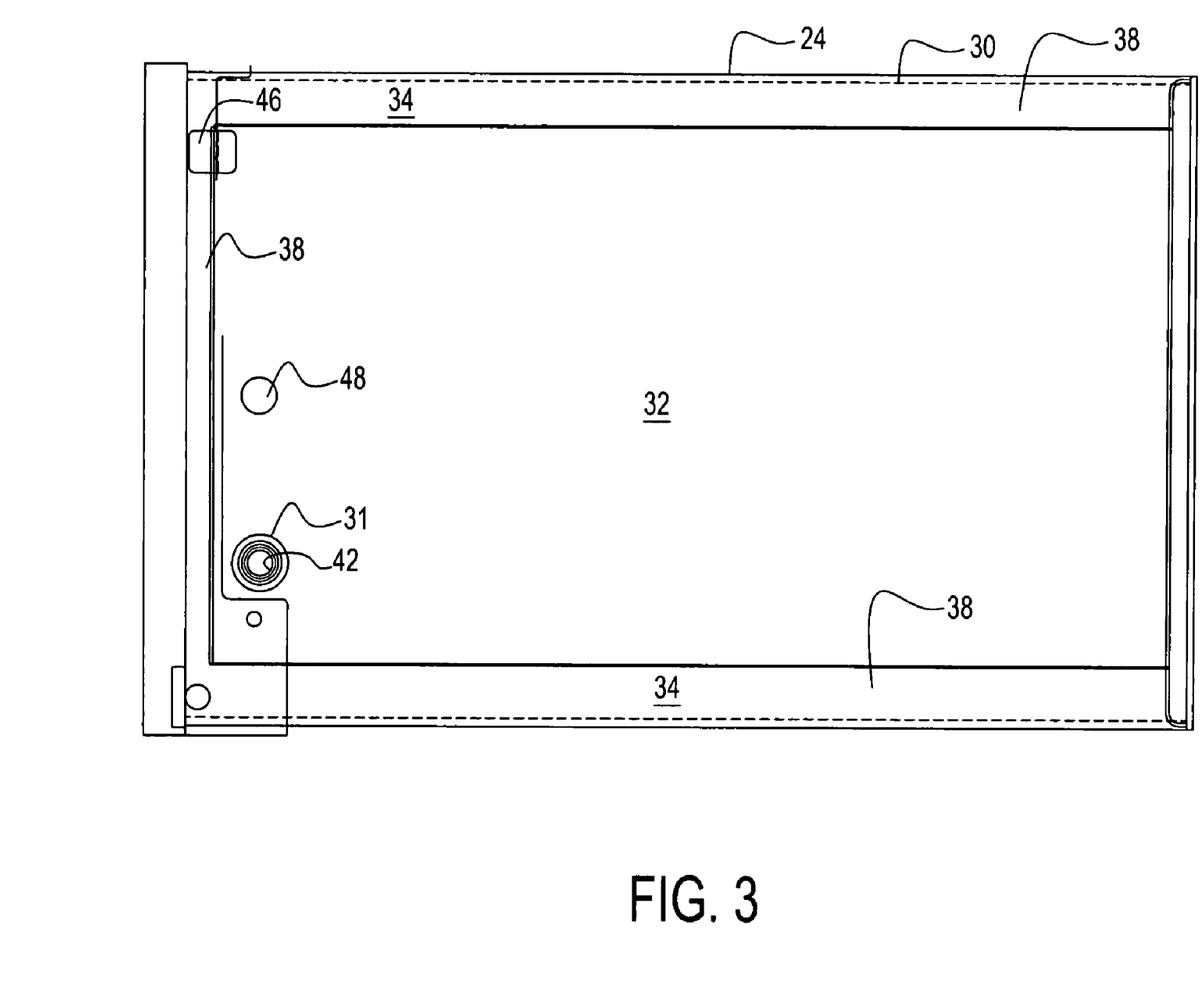
FIG. 3 is a view along the line 3 of FIG. 1.

Referring to FIGS. 1-3, a steaming oven 20 of the present invention includes a housing 22 that supports a cooking chamber 24 and a region 26 for such items as controls, a blower fan, and/or a microwave energy source (none of which is shown). Oven chamber 24 includes a rack holder 28, a reservoir 30, and a collector plate 32. Rack holder 28 holds a rack (not shown) upon which food may be located for cooking. It will be apparent to those skilled in the art that rack holder 28 may include additional holders to hold more than one rack.

Reservoir 30 is formed by the bottom and four sides of oven chamber 24 to hold water 34. It will be apparent to those skilled in the art that reservoir 30 may be a separate tray or other vessel. An overfill tube 31 is disposed in reservoir 30 to prevent water 34 from exceeding a predetermined level therein.

Reservoir 30 comprises a water fill valve (not shown) and a drain 48. The water fill valve may be manually operated or automatically operated in response to a water level probe or sensor 122 or 124 (shown in FIG. 7) that senses water level in reservoir 30. Drain 48 may be interconnected with tubing and a drain valve (neither being shown) to drain water 34 from reservoir 30. Overfill tube 31 is connected via an oven exit hole 50 to drain water 34 and waste material to an external drain or vessel.

A heater 36 is disposed in region 26 in a location to heat reservoir 30 so as to boil water 34, thereby producing steam. For example, heater 36 may be disposed below reservoir 30. Heater 36 may be an electrical heater, a gas burner or other heater suitable for heating reservoir 30 to boil water 34.

Collector plate 32 is disposed in oven chamber 24 above reservoir 30 so as to prevent waste material from falling into reservoir 30 and contaminating water 34. Thus, collector plate 32 is large enough to catch waste material produced by cooking and small enough to allow steam from reservoir 30 to rise in oven chamber 24 for cooking. To this end, collector plate 32 is shorter in width and length than reservoir 30 to form a passage 38 as a border between collector plate 32 and the perimeter of reservoir 30 to allow steam to rise and fill oven chamber 24. Passage 38 is formed on the sides and back of oven chamber 24, but could just as well also be formed on the front thereof. It will be apparent to those skilled in the art that passage 38 can be along more or less than three sides of collector plate 32 or could even be formed by perforations in a border of collector plate 32.

The waste material, for example, includes solid and liquid droppings from the food being cooked as well as condensed steam droplets. The droppings may be directly from the food or from solid or perforated pans holding the food.

Figure 4:
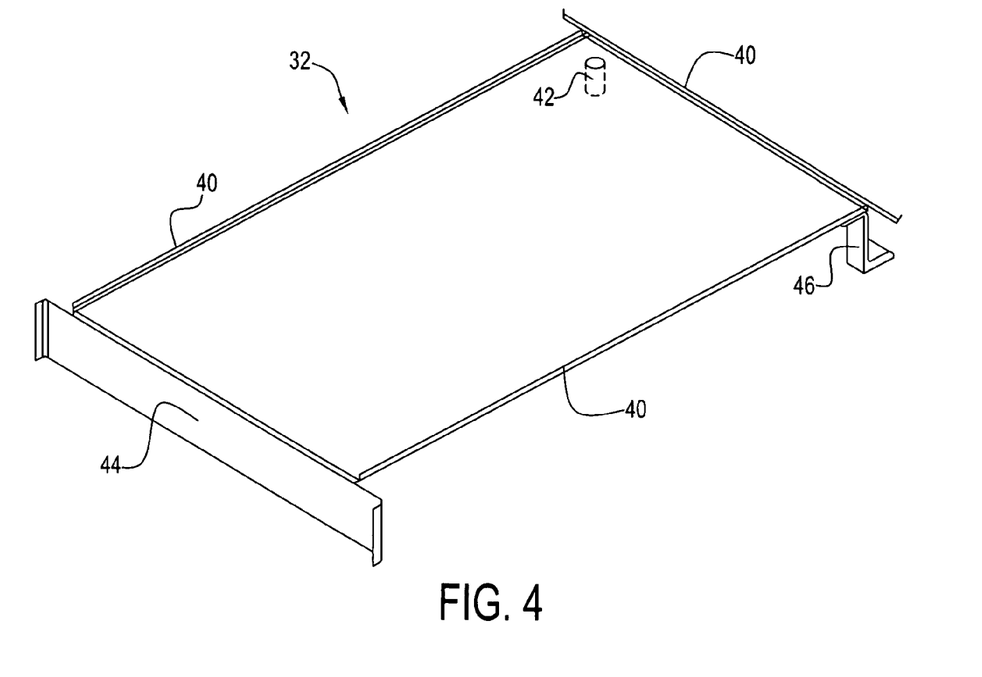
FIG. 4 is a perspective view of the collector plate of the oven of FIG. 1.

Referring also to FIG. 4, collector plate 32 has a retaining lip 40 on its side and rear edges and a drain tube 42. Lip 40 retains and directs the waste material fluid to drain tube 42. The back corners of collector plate 32 are sealed to prevent leakage of the waste material fluid.

Collector plate 32 has a support 44 along a front edge thereof and a support 46 at the back corner that is remote from the location of drain tube 42. Supports 44 and 46 act to position collector plate 32 within oven chamber 24 so that drain tube 42 is in registry with overfill tube 31 of reservoir 30 (best seen in FIGS. 1 and 2). Drain tube 42 has a smaller diameter than that of overfill tube 31 so that drain tube 42 extends removably into overfill tube 31. Overfill tube 31, front support 44 and back corner support 46 are dimensioned so that when installed in oven chamber 24, collector plate 32 slopes downwardly toward drain tube 42 so that the waste material flows by gravity along the surface of collector plate 32 to drain tube 42. For example, front support 44 and back corner support 46 can be higher than overfill tube 42. Alternatively, the sloping can be achieved, for example, by different elevations of the areas within reservoir 30 upon which supports 44 and 46 rest.

Overfill tube 42 is high enough to provide additional support for collector plate 32. Alternatively, an additional back support can be provided at any suitable location, such as, for example, the back corner that is opposite back support 46. Drain tube 42 is designed to fit loosely in overfill tube 31 to facilitate easy installation and removal for cleaning purposes. Preferably, the highest point of collector plate 32 is at the front of oven chamber 24 and below the door opening. This assures that oven chamber 24 cannot be flooded (and injure a person opening the door) in the case of a malfunctioning water fill valve (not shown).

Figure 5:
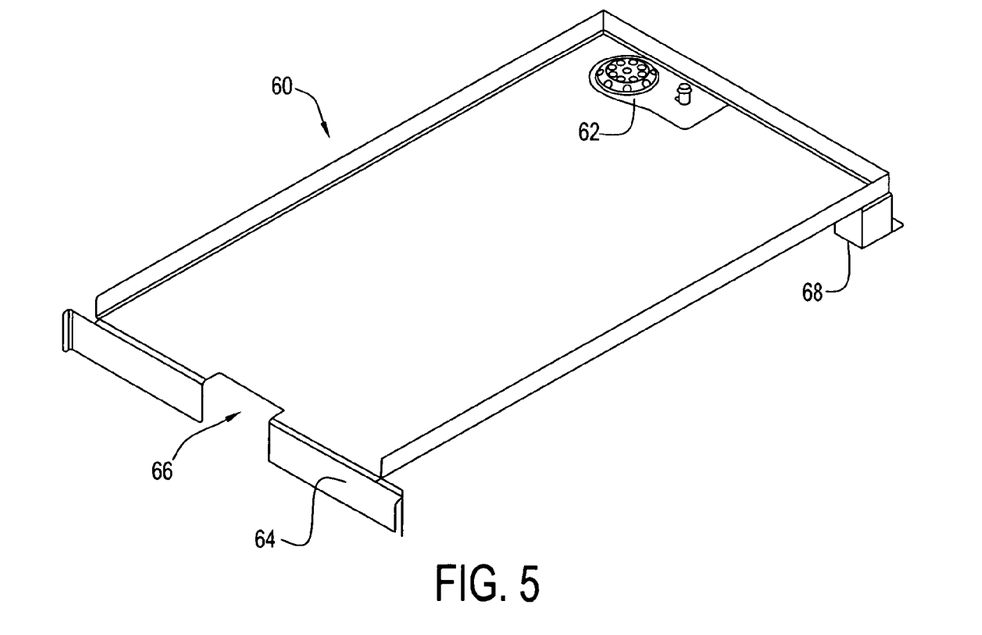
FIG. 5 is a perspective view of an alternative embodiment of the collector plate of the oven of FIG. 1.

Referring to FIG. 5, an alternative collector plate 60 of the present invention is shown. Collector plate 60 has a drain screen 62 that is positioned over a drain tube not shown in FIG. 5. Drain screen 62 traps oversize waste particles that might otherwise clog the drain tube, overfill tube 31 and/or other tubing in the drain system.

Collector plate 60 also has a front support 64 and a back support 68. Front support 64 has an opening 66 that allows manual filling of water into reservoir 30 without removal of collector plate 60. Back support 68 is constructed of tubing that affords robust support for collector plate 60. The tubing may be any desired shape, such as the square shape shown in FIG. 5.

Steaming oven 20 of the present invention provides several advantages. Collector plate 32 prevents contaminants from entering reservoir 30, which in turn prevents those materials from contaminating food cooked in later batches with the tastes or residues of previously cooked items. The removal of contaminants from reservoir 30 significantly reduces the potential for generating foam in oven chamber 24. This foam can spill from oven chamber 24 when the door is opened. This can cause slipping hazards and other undesirable effects. Overfill tube 31 also provides a safety overflow drain to prevent oven chamber 24 from flooding in the event of component failure in the automatic water fill system. If oven chamber 24 flooded and an operator opened the door, there would be a potential for serious injury, both from the hot water itself and also from the potential slipping hazard of water on the floor. Collector plates 32 and 60 may be fabricated from any suitable material, such as metal, plastic and the like. Preferably, collector plates 32 and 60 are stainless steel. Also, collector plates 32 and 60 are preferably removable for ease of cleaning. Collector plates 32 and 60 may be designed to be "self-positioning" when installed in the cooking compartment. Removal of the contaminants before they enter water reservoir 30 reduces the amount of reservoir cleaning that is required. Gap 38 between collector plate 32 and the sides of the oven chamber 24 provide space for improved steam circulation, leading to better cooking performance.

Figure 6:
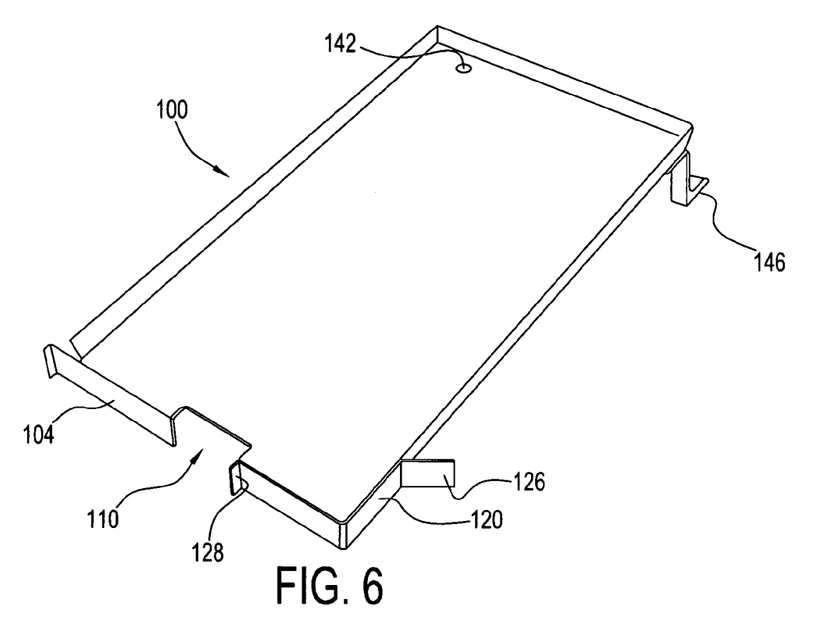
FIG. 6 is a perspective view of an alternate embodiment of the collector plate of the oven of FIG. 1.

Referring to FIG. 6, an alternative collector plate 100 of the present invention has a retaining lip 140 on its side and rear edges and a drain tube 142. Lip 140 retains and directs the waste material fluid to drain tube 142. The back corners of collector plate 100 are sealed to prevent leakage of the waste material fluid.

Collector plate 100 has a front support 104 along a front edge thereof and a back support 106 at a suitable location, for example, the back corner that is remote from the location of drain tube 142. Supports 104 and 106 act to position collector plate 100 within oven chamber 24 so that drain tube 142 is in registry with overfill tube 31 of reservoir 30 (best seen in FIGS. 1 and 2). Front support 104 is adjacent an opening 110 that allows manual filling of water into reservoir 30 without removal of collector plate 100. Drain tube 142 has a smaller diameter than that of overfill tube 31 so that drain tube 142 extends removably into overfill tube 31. Overfill tube 31, front support 104 and back corner support 106 are dimensioned so that when installed in oven chamber 24, collector plate 100 slopes downwardly toward drain tube 142 so that the waste material flows by gravity along the surface of collector plate 100 to drain tube 142. For example, front support 104 and back corner support 106 can be higher than overfill tube 142. Alternatively, the sloping can be achieved, for example, by different elevations of the areas within reservoir 30 upon which supports 104 and 106 rest.

Overfill tube 31 is high enough to provide additional support for collector plate 100. Alternatively, an additional back support can be provided at any suitable location, such as, for example, the back corner that is opposite back support 106. Drain tube 142 is designed to fit loosely in overfill tube 31 to facilitate easy installation and removal for cleaning purposes. Preferably, the highest point of collector plate 100 is at the front of oven chamber 24 and below the door opening. This assures that oven chamber 24 cannot be flooded (and injure a person opening the door) in the case of a malfunctioning water fill valve (not shown).

Figure 7:
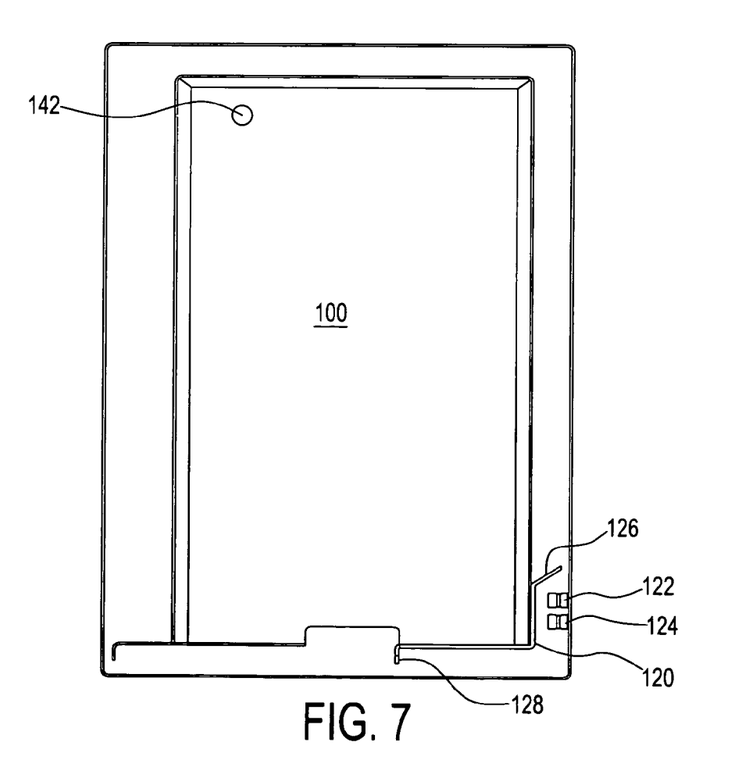
FIG. 7 is a view similar to FIG. 3 except with the collector plate of FIG. 6.

Referring to FIGS. 6 and 7, a barrier that includes a barrier wall 120 provides a quiet zone around a pair of water level probes or sensors 122 and 124 disposed in reservoir 30, thereby shielding the water level probes from water turbulence. Water level probe or sensor 122 is vertically positioned to sense a low water level and in response to provide a signal that interrupts heating source 36 until such time as the water level reaches a minimum permitted operating level in reservoir 30. On the other hand, water level probe or sensor 124 is positioned vertically to sense a high water level and in response to provide a signal that turns the water supply valve off, the water supply valve being on when the water level is below the high water level. Barrier wall 120 extends downwardly from an edge of collector plate 100 so as to span a range of water levels that preferably includes the aforementioned high and low water levels. Preferably, barrier wall is sized vertically to provide support for collector plate 100. Barrier wall 120 extends horizontally a distance that encompasses water level probes 122 and 124.

Water level probes or sensors 122 and 124 are preferably located adjacent one side of reservoir 30 and toward the front of the oven to facilitate cleaning through the oven door. For this preferred location, barrier wall 120 extends horizontally along the edge of collector plate 100 that faces water level probes 122 and 124. Barrier wall 120 may extend around the front corner of collector plate 100, but alternatively may end before the corner.

A tab 126 is located on one side of water level probes 122 and 124 and a tab 128 is located on the other side to additionally shield water level probes 122 and 124. For example, tab 126 is located on the side adjacent water level probe 122 and tab 128 is located on the side adjacent tab 124. Tab 126 is angled toward the rear of collector plate 100 so as to divert water turbulence away from the area of water probes 122 and 124, thereby improving water level control through reliable water level measurements. Tab 126 also diverts any fallen food particles not intercepted by collector plate 100 from fouling water level probes 122 and 124.

Tab 126 is sized to maintain a predetermined clearance between barrier wall 120 and water level probes 122 and 124 so as to prevent accidental contact of water level probes 122 and/or 124 with barrier wall 120 and/or lip 120 of collector plate 100.

Barrier wall 120 and tabs 126 and 128 may be made as a single integral piece or as a plurality of separate pieces. In either case, barrier wall 120 and tabs 126 and 128 are affixed to collector plate 100 by a suitable fastener. For example, the fastener may be a weldment, bolts, screws, adhesives, a form press fit construction or a combination thereof.

The quiet zone has some beneficial effects on the over all operation of steaming oven 20. For example, angled tab 126 shields the quiet zone by diverting any debris that falls into reservoir 30 away from water level probes 122 and 124. Without the diversion, the debris could short out water level probes 122 and/or 124 and result in steaming oven 20 running out of water.

Also, the stabilized water level can be more evenly controlled, thereby resulting in a more even measurement of the actual water level. In the quiet zone, surface tension allows for longer and more consistent contact between water level probes 122 and/or 124 and the actual water level. This reduces the number of cycles on and off experienced by the water fill solenoid and increases the life of steaming oven 20 and reduces warranty cost on the solenoid fill valve and water level probes 122 and 124.

The present invention having been thus described with particular reference to the preferred forms thereof, it will be obvious that various changes and modifications may be made therein without departing from the spirit and scope of the present invention as defined in the appended claims.

What is claimed is:

1. A steaming oven comprising:
an oven chamber;
a water reservoir disposed in said oven chamber to provide steam therein;
at least one water level sensor located to sense a water level in said water reservoir; and
a barrier located at least partially in said water reservoir to provide a quiet zone where said water level sensor senses said water level, wherein said water level is stabilized in said quiet zone despite water turbulence outside said quiet zone, wherein said water level sensor is located at an edge of said water reservoir, and wherein said barrier comprises at least a first portion that is located to one side of said water level sensor and that is angled toward said edge to provide shielding from said water turbulence.

2. The steaming oven of claim 1, wherein said barrier further comprises at least a second portion that is located to the opposite side of said sensor to provide additional shielding from said water turbulence.

3. A steaming oven comprising:
   an oven chamber;
   a water reservoir disposed in said oven chamber to provide steam therein;
   at least one water level sensor located to sense a water level in said water reservoir;
   a barrier located at least partially in said water reservoir to provide a quiet zone where said water level sensor senses said water level, wherein said water level is stabilized in said quiet zone despite water turbulence outside said quiet zone; and
   a collector plate that is positioned above said water level.

4. The steaming oven of claim 3, wherein said barrier is attached to said collector plate by at least one fastener selected from the group consisting of: weldment, bolts, screws, adhesives, a form press fit construction or a combination thereof.

5. The steaming oven of claim 3, further comprising a conduit positioned to convey waste material collected by said collector plate from said oven chamber.

6. The steaming oven of claim 5, wherein said conduit is at least partially disposed in said water reservoir, and wherein an opening of said conduit is above water in said water reservoir.

7. The steaming oven of claim 6, wherein said waste material is conveyed to said opening of said conduit.

8. The steaming oven of claim 6, wherein said opening is in registry with a drain of said collector plate.

9. The steaming oven of claim 5, further comprising a drain situated in said collector plate, and wherein said drain is in registry with said conduit.

10. The steaming oven of claim 5, further comprising an exit hole, and wherein said waste material is conveyed from said oven via a drain, said conduit and said exit hole.

11. The steaming oven of claim 5, wherein said conduit conveys said waste material from said oven chamber without contaminating water in said reservoir.

12. The steaming oven of claim 5, wherein said conduit is positioned to also convey an overflow of water from said water reservoir.

13. The steaming oven of claim 5, wherein said conduit is at least partially disposed in a region between said collector plate and said water reservoir.

14. A method of providing steam in a steaming oven chamber comprising:
   providing said steam from a water reservoir disposed in said oven chamber;
   sensing a water level in said water reservoir with at least one water level sensor; and
   shielding said water level sensor from water turbulence in said water reservoir, thereby providing a sensed water level without substantial interference from said water turbulence, wherein said water level sensor is located at an edge of said water reservoir, and wherein said barrier comprises at least a first portion that is located to one side of said water level sensor and that is angled toward said edge to provide shielding from said water turbulence.

15. The method of claim 14, wherein said barrier further comprises at least a second portion that is located to the opposite side of said water level sensor to provide additional shielding from said water turbulence.

16. A method of providing steam in a steaming oven chamber comprising:
   providing said steam from a water reservoir disposed in said oven chamber;
   sensing a water level in said water reservoir with at least one water level sensor; and
   shielding said water level sensor from water turbulence in said water reservoir, thereby providing a sensed water level without substantial interference from said water turbulence; wherein a collector plate is positioned above said water level.

17. The method of claim 16, wherein said barrier is attached to said collector plate by a fastener selected from the group consisting of: weldment, bolts, screws, adhesives, a form press fit construction or a combination thereof.

18. The method of claim 16, further comprising:
   collecting said waste material in a collector plate disposed above said water level; and
   conveying waste material collected by said collector plate from said oven chamber via a conduit.

19. The method of claim 18, wherein said conduit is at least partially disposed in said water reservoir, and wherein an opening of said conduit is above said water level.

20. The method of claim 19, wherein said waste material is conveyed to said opening of said conduit.

21. The method of claim 19, wherein said opening is in registry with a drain of said collector plate.

22. The method of claim 18, further comprising an exit hole, and wherein said waste material collected by said collector plate is conveyed from said oven via said exit hole.

23. The method of claim 22, wherein said exit hole is located outside of said water reservoir.

* * * * *